(12) United States Patent
Bell, Jr.

(10) Patent No.: US 7,343,592 B2
(45) Date of Patent: Mar. 11, 2008

(54) BENCHMARK SYNTHESIS USING WORKLOAD STATISTICS

(75) Inventor: Robert H. Bell, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 572 days.

(21) Appl. No.: 10/870,527

(22) Filed: Jun. 17, 2004

(65) Prior Publication Data

US 2005/0283762 A1    Dec. 22, 2005

(51) Int. Cl.
    *G06F 9/44* (2006.01)
(52) U.S. Cl. .............. 717/134; 717/104; 717/105; 717/135; 717/136; 703/22
(58) Field of Classification Search .......... 703/22; 717/104, 105, 124, 126, 135, 136
See application file for complete search history.

(56) References Cited

U.S. PATENT DOCUMENTS

| | | | | |
|---|---|---|---|---|
| 5,819,066 A | * | 10/1998 | Bromberg et al. | 707/102 |
| 6,145,121 A | * | 11/2000 | Levy et al. | 717/135 |
| 7,007,270 B2 | * | 2/2006 | Martin et al. | 717/131 |
| 2002/0166112 A1 | * | 11/2002 | Martin et al. | 717/124 |
| 2004/0167765 A1 | * | 8/2004 | Abu El Ata | 703/22 |
| 2004/0193395 A1 | * | 9/2004 | Paulraj | 703/22 |
| 2005/0120341 A1 | * | 6/2005 | Blumenthal et al. | 717/158 |

OTHER PUBLICATIONS

"Synthetic Floating-Point Workloader." IBM Technical Disclosure Bulletin 28(1986): 5358-5363.*
Weicker, Reinhold. "Dhrystone: A synthetic systems programming benchmark." Communcations of ACM 27(1984): 1013-1030.*
Bargrodia, Rajive, Ewa Deelman, Steven Docy, Thomas Phan. "Performance prediction of large parallel applications using parallel simulations ." Proceedings of the seventh ACM SIGPLAN symposium on Principles and practice of parallel programming PPoPP '99 34(1999): 151-162.*

* cited by examiner

*Primary Examiner*—Wei Zhen
*Assistant Examiner*—Matthew J Brophy
(74) *Attorney, Agent, or Firm*—Duke W. Yee; Diana R. Gerhardt; Gerald H. Glanzman

(57) ABSTRACT

A synthetic benchmark for a computer program and a method and computer program product for creating a synthetic benchmark for a computer program. The synthetic benchmark is created using statistical information that is collected about an executing program, and some hints about the machine on which the benchmark will be run. When executed, the synthetic benchmark exhibits behavior similar to the computer program to permit computer performance to be accurately measured.

3 Claims, 2 Drawing Sheets

BENCHMARK SYNTHESIS USING WORKLOAD STATISTICS

BACKGROUND OF THE INVENTION

1. Technical Field

The present invention relates generally to the data processing field and, more particularly, to a synthetic benchmark for a computer program, and to a method and computer program product for creating a synthetic benchmark for a computer program.

2. Description of Related Art

Benchmarks are used by academia and industry to measure computer performance. The benchmarks that are typically used are either programs that have been made available for use as benchmarks by the owner or other supplier of the programs, or are synthetic benchmarks that have been coded by hand to represent particular programs.

Neither approach provides a fully satisfactory source for benchmarks. For one thing, program owners usually do not want their mission critical applications to be made available free of charge for use as benchmarks. Also, real applications are often very complex and are not easy to use, for example, in a laboratory setting or during early design studies. Synthetic benchmarks coded by hand are often not fully satisfactory because the benchmarks frequently fail to accurately represent real programs.

Some prior efforts to create synthetic benchmarks have focused on simply combining existing programs into a single program in an effort to recreate the behavior of a particular program. The techniques used, however, are ad-hoc, difficult to reproduce and yield mixed results. Other prior efforts have attempted to create a synthetic benchmark having parameters such that, by changing the parameters, the behavior of the benchmark can be made to match the behavior of a particular program. This technique, however, is slow and provides no guarantee that the created benchmark will be capable of matching the complex behavior of current programs.

Benchmarks that are currently in use are also difficult to modify in any meaningful way. As a result, the benchmarks are not changed very often and tend to become obsolete.

Therefore, it would be advantageous to have an improved method for creating a synthetic benchmark for a computer program that, when executed, exhibits behavior similar to the program.

SUMMARY OF THE INVENTION

The present invention provides synthetic benchmark for a computer program and a method and computer program product for creating a synthetic benchmark for a computer program. The synthetic benchmark is created using statistical information that is collected about an executing program, and some hints about the machine on which the benchmark will be run. When executed, the synthetic benchmark exhibits behavior similar to the computer program to permit computer performance to be accurately measured.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
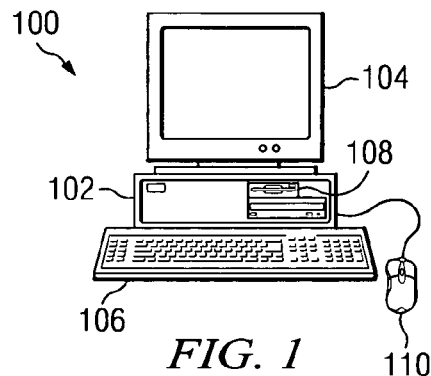
FIG. 1 is a pictorial representation of a data processing system in which the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
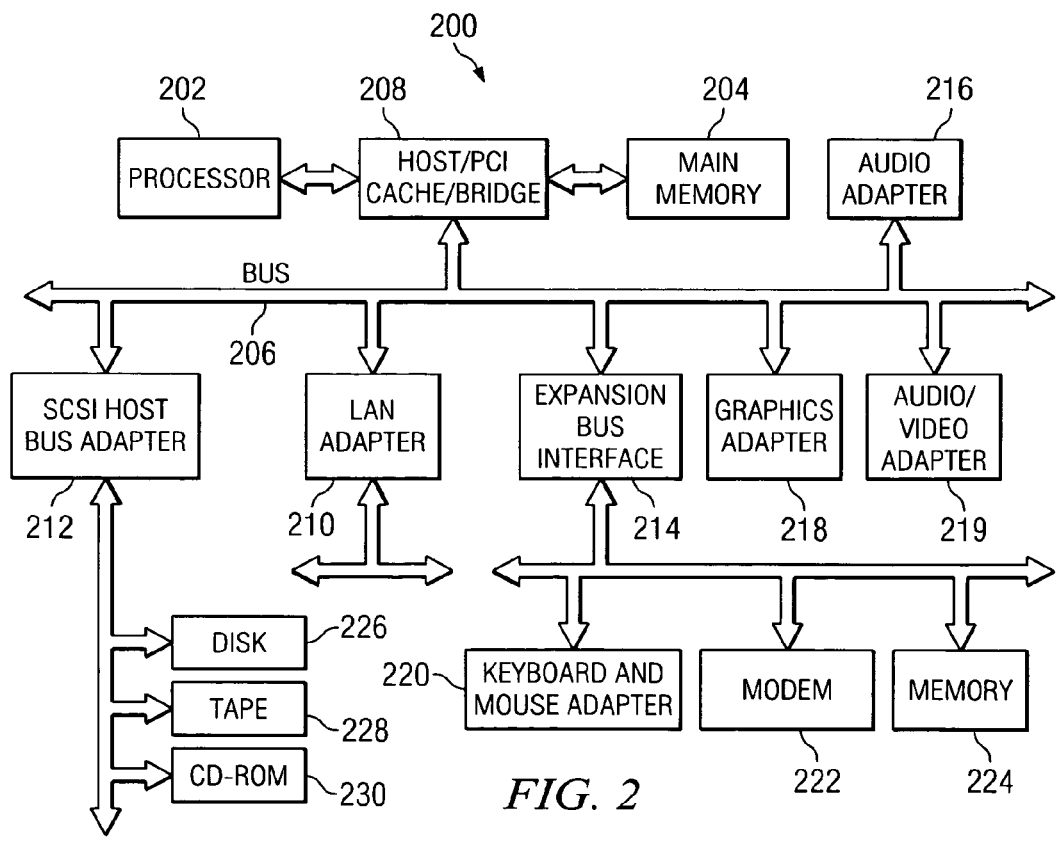
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention provides a method for creating a synthetic benchmark for a computer program that, when executed, reliably exhibits behavior similar to the computer program. The synthetic benchmark is created by recording statistical characteristics of an executing program, and then using the recorded statistical characteristics to automatically synthesize the benchmark.

Figure 3:
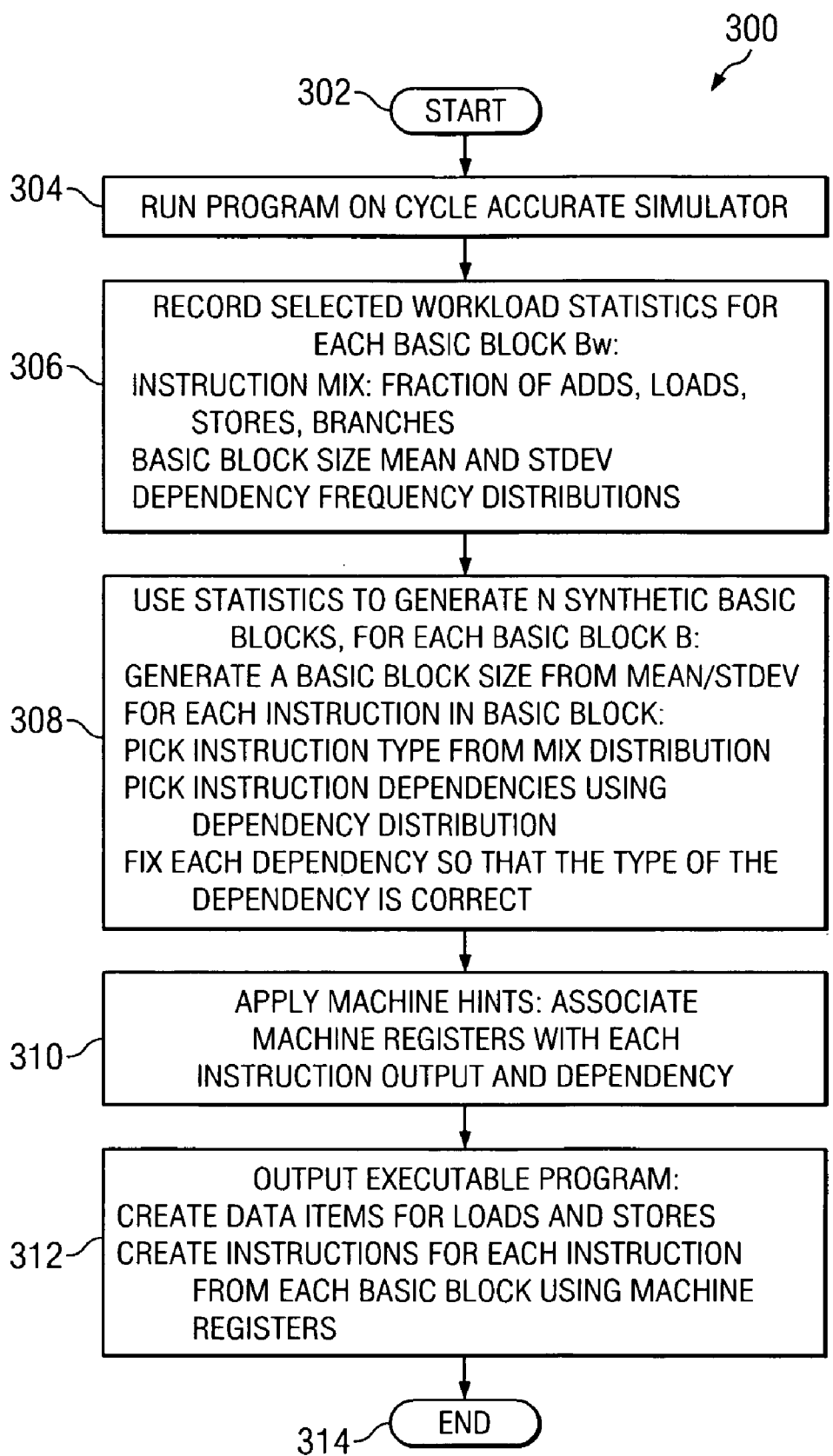
FIG. 3 is a flowchart that illustrates a method for creating a synthetic benchmark for a computer program in accordance with a preferred embodiment of the present invention.

FIG. 3 is a flowchart that illustrates a method for creating a synthetic benchmark for a computer program in accordance with a preferred embodiment of the present invention. The method is generally designated by reference number 300 and after starting (step 302), the computer program for which a synthetic benchmark is to be created is first run on a cycle accurate simulator (step 304). While the program is running, selected statistical characteristics of the program are recorded (step 306). The statistical characteristics that are recorded can be as detailed and as comprehensive of the program execution as is desired. In general, the benchmark that is created will be representative of the original program with respect to the selected statistical characteristics.

After being recorded, the statistical characteristics are used to create a sequence of synthetic basic blocks (step 308). Any or all of the statistical characteristics that were recorded in step 306 can be used in creating the sequence of synthetic basic blocks. The user preferably also supplies hints about the specific computer on which the synthetic benchmark will be run (step 310). Using the synthetic basic blocks and the machine hints, a synthetic benchmark in the form of data and machine instructions is created and output to a file in a format that can be executed on a computer (step 312), and the method ends (step 314).

FIG. 3 also illustrates an implementation of the method to create a benchmark for a particular computer program to assist in providing a clear understanding of the present invention. In the implementation, it is assumed that it is desired to synthesize a benchmark that has the following characteristics matching an executing program: basic block size, instruction mix, and instruction dependency relationships. For simplicity, it is also assumed that all Loads and Stores operate on integer data, and that the computer on which the benchmark will run has machine instruction formats for Loads and Stores that include the addresses of data to be loaded or stored. In some computers, an additional register may be specified to hold the address of the data.

Also for simplicity, it is assumed the following machine instructions are supported: integer Add operations with two input registers and one output register, Stores with one input register and one input data address, Loads with one input data address and one output register, and Branches with two input registers and a branch instruction offset.

In the implementation illustrated in FIG. 3, the following selected statistical characteristics are recorded for each basic block (Bw) in step 306:
  a) Fraction of operations that are Add operations.
  b) Fraction of operations that are Load operations.
  c) Fraction of operations that are Store operations.
  d) Fraction of operations that are Branch operations.
  e) Basic Block Size mean and standard deviation.
  f) For each possible input of each operation type in a-d above, record a frequency distribution of the register dependencies of that input on prior instructions. For each dependency distance, the distribution gives the fraction of all dependencies that the instruction type has with that particular dependency distance. It should be noted that a dependency distance of zero may have a non-zero fraction, indicating that some instructions have an input with no dependency on prior instructions (i.e., immediate operands).

After the selected statistical characteristics have been recorded in step 306, the recorded statistical characteristics are then used to create a sequence of N synthetic basic blocks (step 308). In the implementation illustrated in FIG. 3, a sequence of N basic blocks with Q total instructions is created as follows (N should be a large number, e.g., 100). For each basic block B:
  a) Calculate a size K for basic block B from a normal distribution with mean and standard deviation equal to the values collected in e) above.
  b) For each instruction S from (1 to K) in B do the following:
    1) If S is equal to K, record that S is a Branch operation.
    2) Use a random number from a uniform distribution over {0..1} to select an instruction operation type T for S from the distribution built from the summation of the instruction fractions from a)-d) above.
    3) If S is a Store, Branch or Add instruction, for each particular input I of S, use a random number from a uniform distribution over {0..1} to select a dependency distance D from the distribution built from the summation of the frequency distribution in f) above for the input I of instruction operation type T.

4) For each input I of S, select instruction U at position P (counting from 1 to Q) that is prior to the position R of instruction S in the Q instructions of the sequence of basic blocks by an amount equal to the input I's selected dependency distance D. If the position P of S minus D is less than 1, choose the instruction U at location Q−(D−S). If U is a Store or Branch instruction, move position P forward in the sequence of Q instructions by 1 until instruction U at position P is an Add or Load instruction. If position P plus 1 is ever greater than Q, then set position P to 1. If P ever equals R, record that input I of S has no dependency.

5) Record that instruction S is of type T and record the selected dependency distance P for each input of S.

The user also supplies hints to the benchmark synthesis process to target a specific computer (step 310). In the implementation illustrated in FIG. 3, the register numbers in specific target machine M are used to associate synthetic operation outputs to machine M registers. For each instruction S in the Q instructions, if instruction S is an Add or Load instruction type, associate with it a target machine register A.

A synthetic benchmark in the form of data and machine instructions are then output to a file in a format that can be executed on a computer (step 312). In the exemplary implementation, step 312 includes:

a) open file F.

b) For each instruction S in the sequence of Q instructions:

1) If S is a Load instruction, output a data item of integer type with address L to file F.
2) If S is a Store instruction, output a data item of integer type with address W to file F.
3) If S is a Load instruction, output information to file F that specifies a load instruction type in the machine language of the target machine M, an output machine register A associated with load instruction S, and the data location L associated with load instruction S.
4) If S is a Store instruction, output information to file F that specifies a store instruction type in the machine language of the target machine M, the machine register A associated with instruction U found previously at location P in the sequence of Q instructions for the store S input, and the data location W associated with store instruction S.
5) If S is an Add instruction, output information to file F that specifies an Add instruction type in the machine language of the target machine M, an output machine register A associated with instruction S, and for each input I of S, the machine register A associated with the instruction U found previously at location P in the sequence of Q instructions.
6) If S is a Branch instruction, output information to file F that specifies a Branch instruction type in the machine language of the target machine, for each register input I of S, the machine register A associated with the instruction U found previously at location P in the sequence of Q instructions, and the address of the next instruction that will be written into file F.

c) Close file.

When the above method completes, file F will contain a synthetic benchmark that, when executed on machine M, has similar characteristics to a program executing on machine M. The characteristics chosen in the example implementation described above were basic block size, instruction mix and instruction dependencies although it should be understood that these characteristics are exemplary only. Additional or fewer characteristics, or different characteristics can also be chosen depending on the particular computer program and the requirements of the user.

The present invention thus provides a synthetic benchmark for a computer program and a method and computer program product for creating a synthetic benchmark for a computer program. The synthetic benchmark is created using statistical information that is collected about an executing program, and some hints about the machine on which the benchmark will be run. When executed, the synthetic benchmark exhibits behavior similar to the computer program to permit computer performance to be accurately measured. Since the method is automatic, it is easy to create new benchmarks having different characteristics as applications or input data sets change.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for creating a synthetic benchmark for a computer program, comprising:

executing the computer program;

recording selected statistical characteristics for each basic block of the executing computer program, wherein the selected statistical characteristics for each basic block comprise:

mix distribution statistics regarding a fraction of instructions that are an Add instruction type, a Load instruction type and a Store instruction type;

statistics regarding basic block size mean and standard deviation; and statistics regarding a frequency distribution of register dependencies for each possible input of each of the instruction types;

using the recorded statistical characteristics to create a sequence of synthetic basic blocks, wherein using the recorded statistical characteristics to create a sequence of synthetic basic blocks comprises:

calculating a size for each synthetic basic block from a normal distribution with a mean and standard deviation equal to the statistics regarding basic block size mean and standard deviation; and, for each instruction in each synthetic basic block:
- picking instruction dependencies using the frequency distribution of register dependencies; and
- fixing each selected instruction dependency to provide a correct dependency type;

receiving hints from a user regarding a machine on which the benchmark is to be run to assist in creating the synthetic benchmark;

creating a synthetic benchmark using the sequence of synthetic basic blocks and the received hints from a user, wherein the synthetic benchmark is representative of the computer program with respect to the selected statistical characteristics and is in a format that can be executed on a computer; and outputting the created synthetic benchmark.

2. The method according to claim 1, wherein the executing is performed on a cycle accurate simulator.

3. The method according to claim 1, wherein the outputting comprises outputting a synthetic benchmark in the form of data and machine instructions to a file in a format that can be executed on a computer.

* * * * *